United States Patent [19]
Gregg

[11] Patent Number: 6,031,684
[45] Date of Patent: Feb. 29, 2000

[54] SERVO GAIN OPTIMIZATION USING MODEL REFERENCE SEEKS IN A DISC DRIVE

[75] Inventor: Jason D. Gregg, Oklahoma City, Okla.

[73] Assignee: Seagate Technology, Inc., Scotts Valley, Calif.

[21] Appl. No.: 08/920,599

[22] Filed: Aug. 29, 1997

Related U.S. Application Data

[60] Provisional application No. 60/048,374, Jun. 3, 1997.

[51] Int. Cl.[7] ................................................. G11B 5/596
[52] U.S. Cl. ................................. 360/78.06; 360/78.09; 360/78.14
[58] Field of Search ........................... 360/78.09, 78.06, 360/78.08, 78.14, 78.04

[56] References Cited

U.S. PATENT DOCUMENTS

| | | | |
|---|---|---|---|
| 4,907,109 | 3/1990 | Senio . | |
| 4,937,689 | 6/1990 | Seaver et al. . | |
| 4,965,501 | 10/1990 | Hashimoto . | |
| 5,182,684 | 1/1993 | Thomas et al. ...................... | 360/78.09 |
| 5,262,907 | 11/1993 | Duffy et al. . | |
| 5,276,662 | 1/1994 | Shaver, Jr. et al. . | |
| 5,381,282 | 1/1995 | Arai et al. ............................. | 360/78.09 |
| 5,585,976 | 12/1996 | Pham . | |
| 5,631,999 | 5/1997 | Dinsmore . | |
| 5,659,438 | 8/1997 | Sasamoto et al. ................... | 360/78.09 |
| 5,680,272 | 10/1997 | Kadlec et al. ....................... | 360/78.09 |
| 5,847,895 | 12/1998 | Romano et al. ..................... | 360/78.09 |

*Primary Examiner*—Andrew L. Sniezek
*Attorney, Agent, or Firm*—Crowe & Dunlevy

[57] ABSTRACT

An apparatus and method for optimizing the gain of a disc drive servo circuit are disclosed, the servo circuit controllably positioning a head adjacent tracks of a disc of the disc drive. A model reference seek is performed using sinusoidally derived reference current, velocity and position signals to move the head from an initial track to a destination track, during which position error is accumulated over a plurality of time periods associated with the seek. The position error is normalized in relation to the length of the seek. A gain adjustment value is next determined in relation to a difference between the normalized position error and a nominal position error associated with a nominal value of gain for the servo circuit, a scale factor being applied to the difference to control the convergence rate of the gain. The gain is thereafter adjusted using the gain adjustment value.

16 Claims, 5 Drawing Sheets

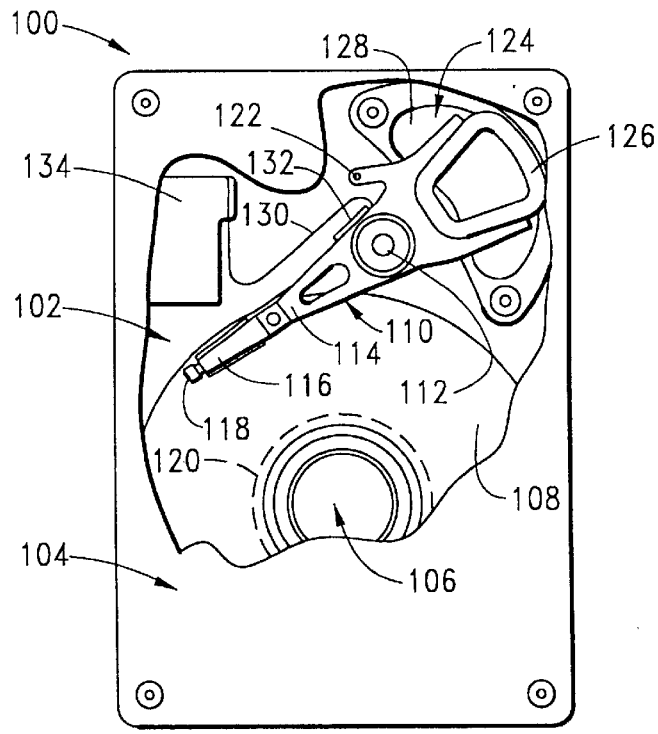
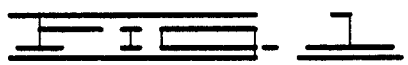
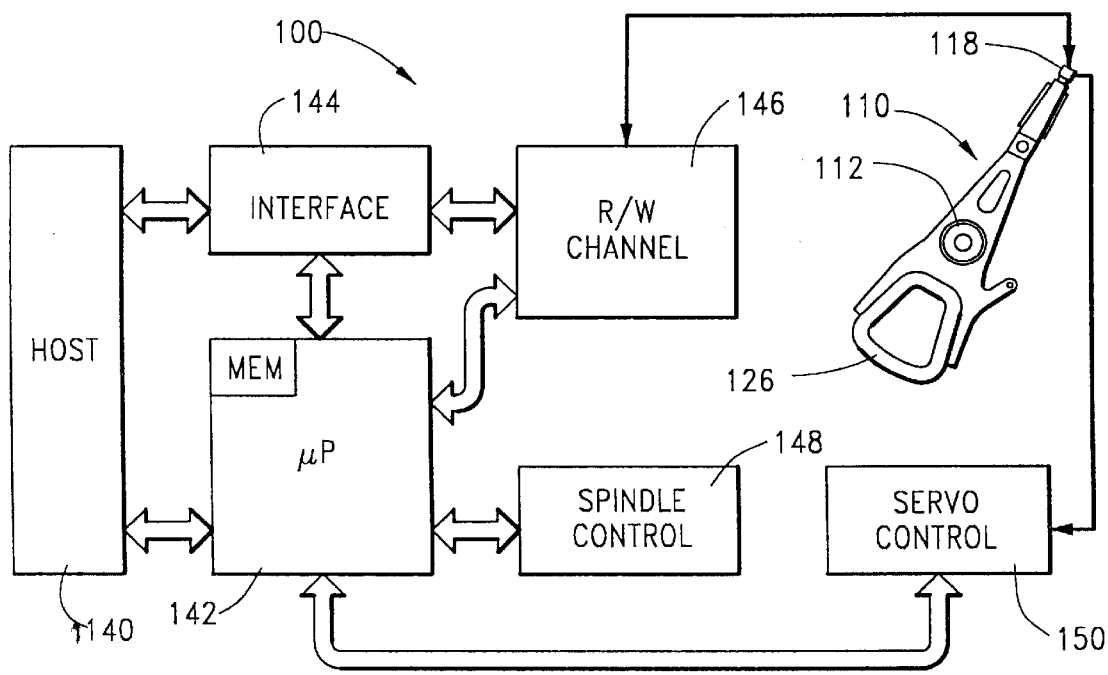
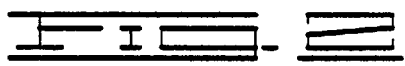

SERVO GAIN OPTIMIZATION USING MODEL REFERENCE SEEKS IN A DISC DRIVE

RELATED APPLICATIONS

This application claims priority to Provisional Application No. 60/048,374 filed Jun. 3, 1997.

FIELD OF THE INVENTION

This invention relates generally to the field of disc drive storage devices, and more particularly, but not by way of limitation, to improving the operational response of a disc drive servo system by optimizing gain of the servo system through the execution of model reference seeks.

BACKGROUND OF THE INVENTION

Hard disc drives are commonly used as the primary data storage and retrieval devices in modern computer systems. In a typical disc drive, the data is magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo information that is written to the surfaces of the discs during manufacturing. The servo system of a disc drive thus utilizes the servo information in the performance of two primary operations: seeking and track following.

Seeking entails the movement of a selected head from an initial track to a destination track. For seeks of a sufficient length, a velocity-control approach is typically employed wherein the velocity of the head is repetitively determined and compared to a velocity profile which defines an optimum velocity trajectory for the head as it moves to the target track. The amount of current applied to an actuator coil varies in proportion to the velocity error, the actuator coil being part of a voice coil motor used to control the position of the head.

Track following entails the continued positioning of a selected head over a corresponding, selected track. A position-control approach is typically employed wherein the relative position of the head with respect to the center of the track is determined and compared to a desired position for the head. The resulting position error is used to control the amount of current that is applied to the actuator coil in order to maintain the head at the desired position relative to the track.

As will be recognized, modern disc drives typically employ an embedded servo scheme wherein the servo information is angularly spaced and interspersed among user data fields (or "sectors") on the surfaces of the discs. However, the sampling rate of the servo information is typically insufficient to provide the gain necessary to maintain the heads within predetermined off track boundaries. Accordingly, a multi-rate observer is deployed to provide estimates of head position, velocity and bias at times when the heads are disposed over the user data fields. Thus, the servo system utilizes position information obtained from the discs to provide the observer with the input required to give estimates for controlling the movement of the heads during seeking and track following. Such observers (or "estimators") are well known in the art and are discussed, for example, in U.S. Pat. No. 5,585,976 issued Dec. 17, 1996 to Pham, assigned to the assignee of the present invention.

A continuing trend in the disc drive industry is to provide disc drives with ever increasing data storage and transfer rate capacities. Some disc drives of the current generation have track densities greater than about 3000 tracks per centimeter (about 8000 tracks per inch). As track densities continue to increase, it becomes increasingly important to provide servo systems that are capable of accurately positioning the heads during seeks and track following modes of operation. Various gains of the servo system are typically selected to achieve a certain control response for the servo system; however, changes in environmental conditions and other factors tend to affect the characteristics of the servo system during operation.

While efforts in the prior art to adapt the operational characteristics of disc drive servo systems in view of changing environmental conditions have been successful, there is a continual need for improvements whereby servo system performance can be enhanced in view of further advancements in the art, such as continued increases in disc drive track densities.

SUMMARY OF THE INVENTION

The present invention provides a method and apparatus for optimizing the gain of a disc drive servo circuit used to position a head adjacent tracks on a disc of the disc drive.

In accordance with the preferred embodiment, a model reference seek is performed wherein the head is moved from an initial track to a destination track in accordance with sinusoidally derived reference current, velocity and position signals. During the seek, multi-rate observer circuitry estimates the position of the head and an accumulator circuit accumulates position error for each of a plurality of multi-rate periods of the seek, with the position error corresponding to the difference between the reference position and the estimated position at each period.

At the conclusion of the seek, the accumulated position error is normalized in relation to the length of the seek and a gain adjustment value is determined in relation to the difference between the normalized accumulated position error and a nominal accumulated position error determined in relation to a nominal gain for the servo circuit. The gain is thereafter optimized by subtracting the gain adjustment value from the existing gain.

The reference current signal is characterized as a modified one minus cosine waveform which is scaled in relation to the length of each seek and is used to derive the reference velocity and position signals. Moreover, a scale factor is used to control the rate of convergence of the gain so that the gain is preferably optimized over a plurality of successive model reference seeks.

These and various other features as well as advantages which characterize the present invention will be apparent from a reading of the following detailed description and a review of the associated drawings.

BRIEF DESCRIPTION OF THE DRAWINGS

FIG. 1 shows a top plan view of a disc drive constructed in accordance with the preferred embodiment of the present invention.

FIG. 2 provides a functional block diagram of the disc drive of FIG. 1 operably connected to a host computer in which the disc drive is mounted.

FIG. 6 shows a flow chart for a disc drive seek routine carried out in accordance with the preferred embodiment of the present invention and is representative of programming utilized by the servo processor of FIG. 3.

DETAILED DESCRIPTION

Figure 3:
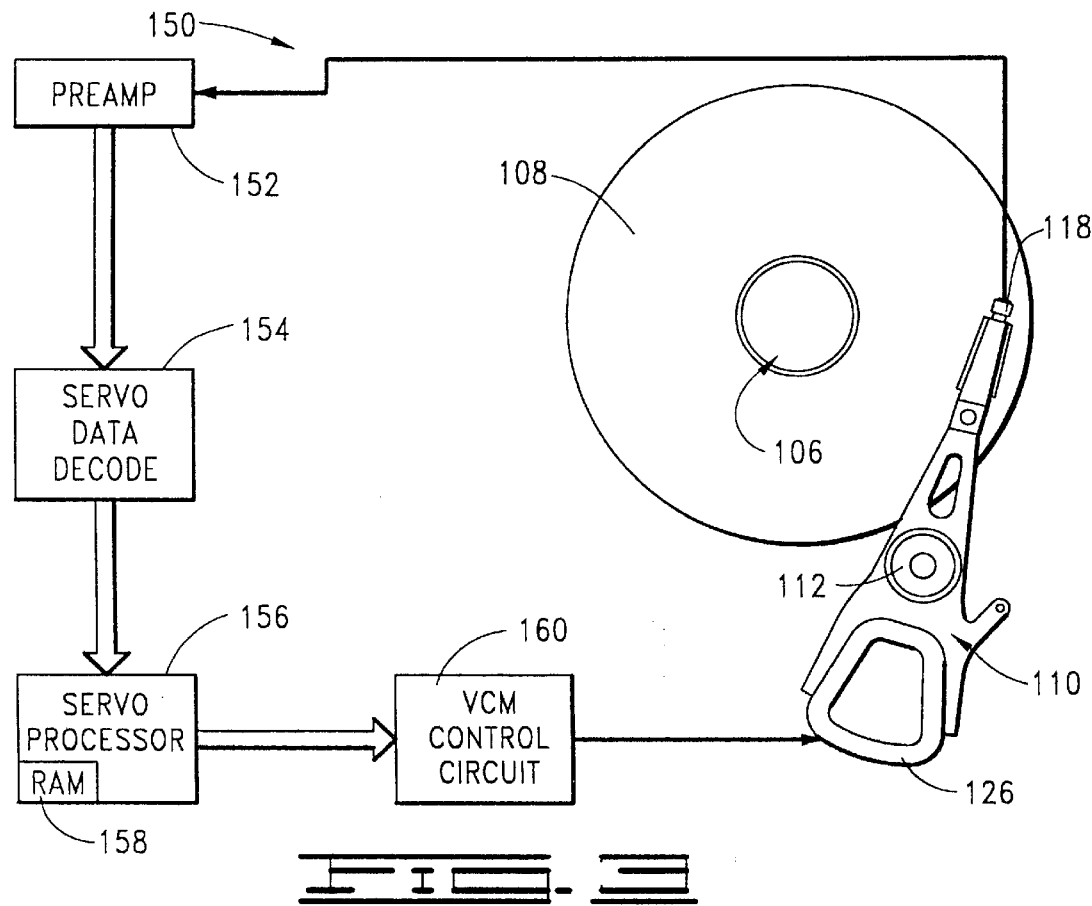
FIG. 3 provides a functional block diagram of a servo control circuit shown in FIG. 2.

Referring now to FIG. 1, shown therein is a top plan view of a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) is provided to rotate one or more discs 108 at a constant high speed (such as 7,200 revolutions per minute). User data is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. As will be recognized, a second magnetic flux path is disposed above the permanent magnet 128, but has not been shown for purposes of clarity. The controlled application of current to the coil 126 causes magnetic interaction between the permanent magnet 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming stored in microprocessor memory (MEM) 143. The MEM 143 can include random access memory (RAM), read-only memory (ROM) and other sources of resident memory for the microprocessor 142.

Data is transferred between the host computer 140 and the disc drive 100 by way of a disc drive interface 144, which includes a buffer to facilitate high speed data transfer between the host computer 140 and the disc drive 100. Data to be written to the disc drive 100 is thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operation of the disc drive 100 is well known in the art and discussed, for example, in U.S. Pat. No. 5,276,662 issued Jan. 4, 1994 to Shaver et al., assigned to the assignee of the present invention.

The discs 108 are rotated by a spindle control circuit 148, which electrically commutates the spindle motor 106 (FIG. 1) through the use of back electromotive force (bemf) sensing. Spindle control circuits such as represented at 148 are well known and are discussed, for example, in U.S. Pat. No. 5,631,999 issued May 20, 1997 to Dinsmore, assigned to the assignee of the present invention.

As discussed above, the radial position of the heads 118 is controlled through the application of current to the coil 126 of the actuator assembly 110. Such control is provided by a servo control circuit 150, a functional block diagram of which is provided in FIG. 3.

Referring now to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

The servo processor 156 determines head position error from the relative magnitudes of the digital representations of the burst signals and, in accordance with commands received from the disc drive microprocessor 142 (FIG. 2), determines the desired position of the head 118 with respect to the disc 108. In response, the servo processor 156 outputs a current command signal to the VCM control circuit 160, which includes an actuator driver that applies current of a selected magnitude and direction to the coil 126 in response to the current command signal.

The servo information on the discs 108 is recorded during the manufacturing of the disc drive 100 using a highly precise servo track writer. The servo information serves to define the boundaries of each of the tracks and is divided circumferentially into a number of frames, with user data fields disposed therebetween. Because the sampling rate of the servo frames is generally insufficient to adequately control the positioning of the head 118, as described below a multi-rate observer is additionally deployed to provide estimates of head position, velocity and bias force so that corrections can be made in the positioning of the head 118 at times when the head 118 is over the user data fields between each pair of successive servo frames.

Figure 4:
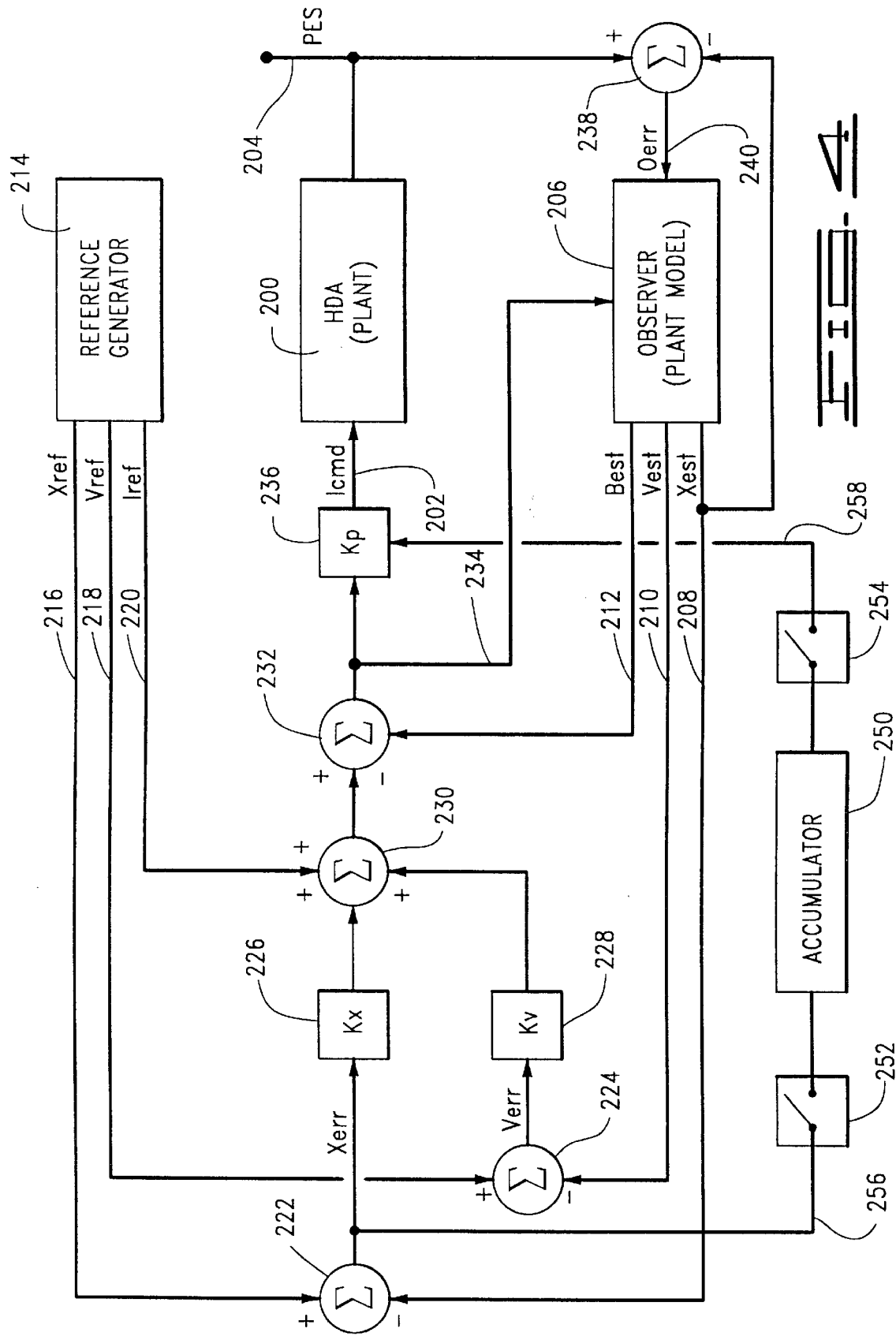
FIG. 4 is a control diagram for the disc drive servo control circuit of the disc drive of FIG. 1, portions of which are representative of functions carried out by the servo processor of FIG. 3.
Figure 5:
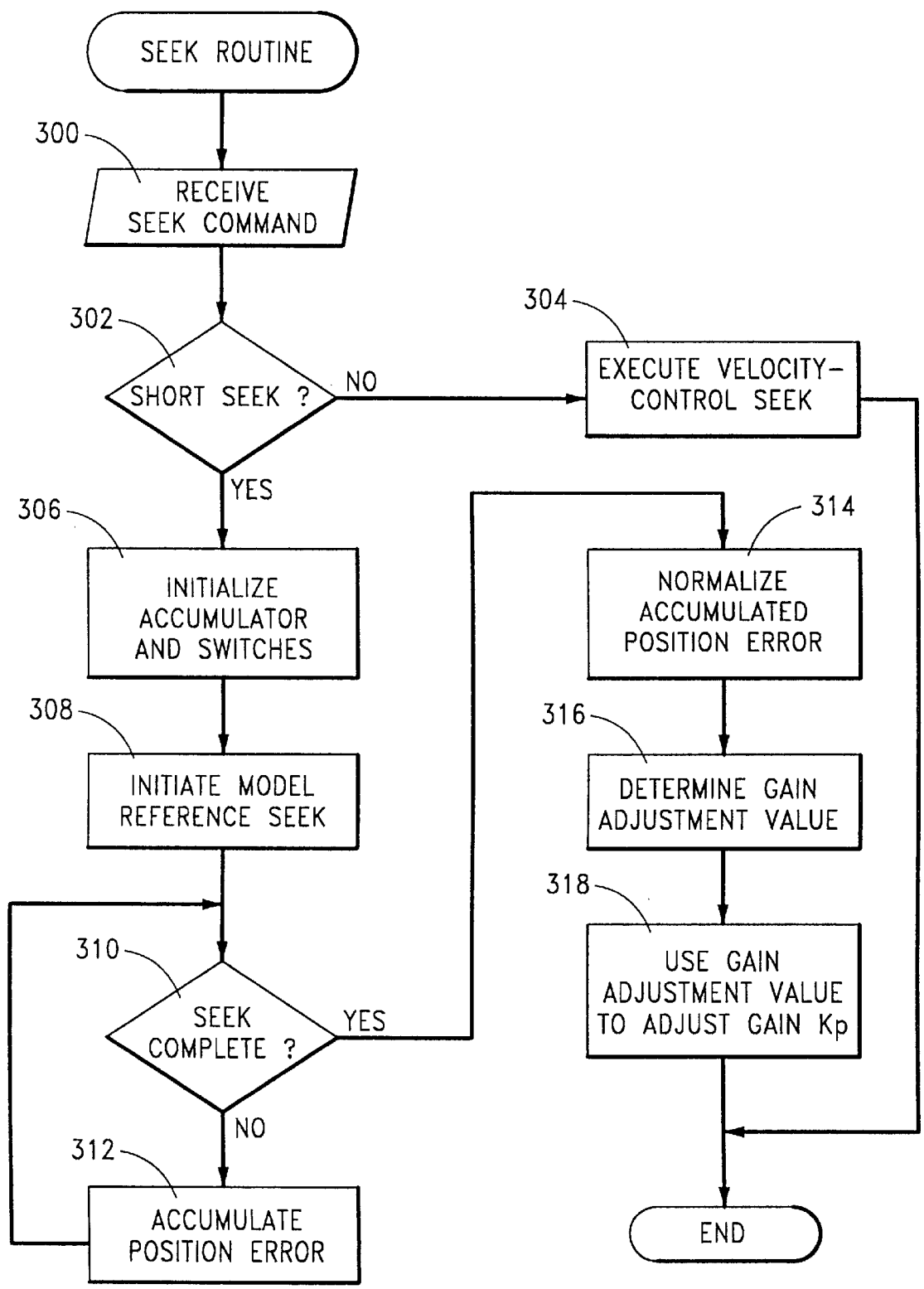

Referring now to FIG. 4, shown therein is a generalized control diagram for the servo circuit 150 of FIG. 3. Portions of the control diagram of FIG. 4 can be readily implemented through appropriate programming utilized by the servo processor 156.

As shown in FIG. 4, a portion of the disc drive 100 referred to as the "plant" is denoted by block 200 and generally comprises the servo circuit 150, the actuator assembly 110, a selected head 118 and the corresponding disc 108. The plant 200 receives a current command signal ("Icmd") on signal path 202 to position the head 118 adjacent a selected track. In response to servo information on the track, the plant 200 generates a position error signal (PES) which is output on signal path 204.

The control diagram of FIG. 4 also shows a multi-rate observer 206, or plant model, which is designed to have the same nominal input/output response characteristics as the plant 200. As will be recognized by those skilled in the art, the observer 206 generates a position estimate ("Xest"), a velocity estimate ("Vest") and a bias estimate ("Best") on signal paths 208, 210 and 212, respectively, which correspond to estimates of head position, head velocity and bias force. The bias force estimate takes into account spring forces exerted upon the actuator as a result of the flexure assembly (such as 130 of FIG. 1) and windage forces upon the heads and is indicative of the amount of current required to maintain the selected head at the current position in view of such forces.

Additionally, a reference generator 214 is provided which provides position reference ("Xref"), velocity reference ("Vref") and current reference ("Iref") signals indicative of the desired position, velocity and current settings for the plant 200. These signals are output on paths 216, 218 and 220, respectively and have values which generally depend upon the particular operational mode of the servo circuit, such as track following or seeking. As will be recognized, the current reference Iref is typically provided with a value of zero during track following, but as discussed below takes both positive and negative values during certain types of seeks in order to first accelerate and then decelerate the heads 118 from the initial track to the destination track.

A summing junction 222 determines a position error ("Xerr") as the difference between the position reference Xref and the position estimate Xest. Similarly, a summing junction 224 determines a velocity error ("Verr") as the difference between the velocity reference Vref and the velocity estimate Vest. The position error Xerr is provided to a gain block 226 having a scaler gain of Kx and the velocity error Verr is provided to a gain block 228 having a scaler gain of Kv, so that the output quantities are summed by a summing junction 230 (along with the current reference Iref).

The output of the summing junction 230 is further summed with the bias estimate Best at a summing junction 232, as shown. The output of the summing junction 232 is provided on signal path 234 as a control input to the observer 206 and is indicative of the amount of current to be applied to the plant 200.

The output of the summing junction 232 is further provided to a gain block 236 having a gain Kp, so that the output thereof comprises the current command Icmd signal on path 202. The gain block 236 provides the primary gain for the servo circuit 150 and is intended to ensure that the operational characteristics of the observer 206 closely model the characteristics of the plant 200.

Finally, the PES on signal path 204 is summed with the position estimate Xest on path 208 by a summing junction 238 to generate an observer error ("Oerr") signal as an input to the observer 206 on path 240. For reference, the observer 206 is a 4X observer, in that four sets of estimated parameters are output on the paths 208, 210 and 212 for each input of the observer error Oerr signal. Thus, the observer provides a multi-rate of four times the sampling rate of the servo information from the discs 108.

As provided above, the preferred embodiment of the present invention provides an apparatus and method for adaptively adjusting the gain Kp of the gain block 236 during the execution of model reference seeks. To this end, an accumulator block 250 (also referred to as an "integrator" or "1/s" block) is additionally provided in the control diagram of FIG. 4, along with switches 252 and 254 which are provided in series with the accumulator block 250 and control the input of the position error Xerr (along path 256), as well as the output of an updated gain Kp (along path 258) to the gain block 236, as explained below. Before discussing the operation of the control diagram of FIG. 4, however, it will be helpful to first briefly discuss a model reference seek, which is a seek methodology used by the disc drive 100 to move the selected head 118 a relatively short seek distance (i.e., 100 tracks or less).

Figure 5:
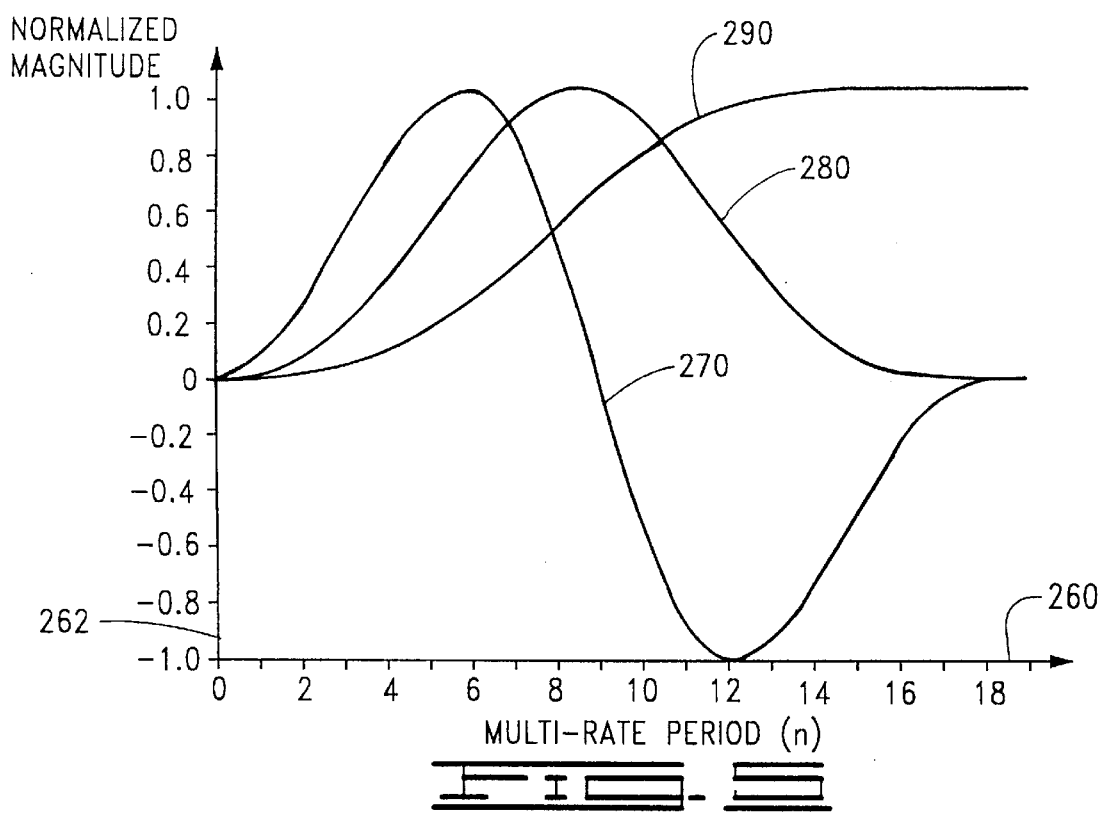
FIG. 5 provides graphical representations of reference current, velocity and position signals output by the reference generator of FIG. 4 during a model reference seek in accordance with the preferred embodiment of the present invention.

A model reference seek is performed using a modified one minus cosine (1−cos) reference current signal which is scaled to each particular seek length (i.e., the number of tracks in the seek). Referring to FIG. 5, shown therein is a set of reference current, velocity and position curves for a model reference seek, plotted against an x-axis 260 indicative of time (in units corresponding to the multi-rate period) and a y-axis 262 indicative of relative magnitude (normalized over a range of from −1 to +1).

As shown in FIG. 5, current curve 270 corresponds to the discrete values of the reference current signal Iref output by the reference generator 214 (FIG. 4) during the model reference seek on path 216. In like manner, velocity curve 280 corresponds to the reference velocity signal Vref output on path 218 and position curve 290 corresponds to the reference position signal Xref output on path 220.

The discrete reference current values of the current curve 270 can be readily determined using the following equations:

$$Iref = \frac{1}{2}\left(1 - \cos\left(\frac{[n \bmod N])\pi}{N}\right)\right)\bigg|\begin{array}{l}n = N-1\\n = 0\end{array} \quad (1)$$

$$Iref = \cos\left(\frac{[n \bmod N]\pi}{N}\right)\bigg|\begin{array}{l}n = 2N-1\\n = N\end{array} \quad (2)$$

$$Iref = \frac{1}{2}\left(-1 - \cos\left(\frac{[n \bmod N])\pi}{N}\right)\right)\bigg|\begin{array}{l}n = 3N-1\\n = 2N\end{array} \quad (3)$$

where n is the multi-rate period, N is a predetermined number associated with the desired duration of the model reference seek (and is equal to six in the example set forth by FIG. 5), and mod is a modulus operator which calculates the remainder of the quotient n/N. As will be recognized, the reference current curve 270 can be readily obtained from equations (1)–(3). Thereafter, the reference velocity curve 280 of FIG. 5 can be obtained by taking the integral of the reference current curve 270 and the reference position curve 290 can be obtained by taking the integral of the reference velocity curve 280.

Referring to FIG. 6, shown therein is a flow chart for a disc drive seek routine, generally illustrating the operation of the servo circuit 150 in accordance with the preferred embodiment. It will be recognized that the flow chart of FIG. 6 corresponds to the control diagram of FIG. 4 and is representative of programming utilized by the servo processor 156. It is contemplated that the routine of FIG. 6 will be executed for each seek performed by the disc drive 100.

Beginning at block 300, the servo processor 156 first receives a seek command from the system microprocessor 142, in which the processor 156 is instructed to move a selected head 118 from the existing track to a destination track. The routine determines the length of the seek in terms of the number of tracks to the destination track in order to determine whether the distance to be travelled falls within the model reference seek threshold (i.e., whether the seek is a "short seek"), as indicated by decision block 302.

As mentioned above, the maximum distance for a model reference seek in the preferred embodiment is 100 tracks. It will thus be recognized seeks longer than 100 tracks are performed using a conventional velocity-control methodology. It has been found desirable to transition from short to long seeks at a seek length where the velocity-control methodology achieves a shorter overall seek time than the model reference seek methodology, so the actual threshold will depend upon the characteristics of a particular drive.

Accordingly, with reference to the routine of FIG. 6, if the destination track is more than 100 tracks away from the initial track, the routine passes from decision block 302 to block 304, wherein the disc drive 100 performs a conventional velocity-control seek. For additional discussion regarding velocity-control seeks, see the previously referenced Duffy et al. U.S. Pat. No. 5,262,907.

When the seek is a short seek, however, the routine passes from decision block 302 to block 306, wherein the accumulator 250 is initialized to a zero count, switch 252 is closed and switch 254 is opened. It is contemplated that the accumulator 250 and the switches 252 and 254 will be embodied in software (firmware), so it will be readily understood that block 306 operates to prepare for the accumulation of the position error Xerr while isolating this accumulation function from the gain Kp of the gain block 236.

Continuing with FIG. 6, the servo circuit 150 next initiates a model reference seek to move the head 118 from the initial track to the destination track, as indicated by block 308. The operation of block 308 includes the selection of appropriate current, velocity and position reference signals Iref, Vref and Xref, respectively through appropriate scaling of the reference curves 270, 280 and 290 of FIG. 5. Once selected, these values are sequentially output at each multi-rate period during the seek on paths 216, 218 and 220 of FIG. 4. During the execution of the model reference seek, as indicated by decision block 310 the routine repetitively checks at each multi-rate period whether the seek has been completed; if not, the routine continues to block 312 wherein the position error Xerr is accumulated by the accumulator 250 and the routine loops back to decision block 310. During the execution of blocks 310 and 312, an accumulated position error "AXerr" is determined using the following relationship:

$$AXerr = AXerr + Xerr \quad (4)$$

where the accumulated position error AXerr, which was initially set to zero (by the operation of block 306), is sequentially updated with the position error Xerr at each multi-rate period.

The routine continues until the model reference seek is completed, after which the routine passes from decision block 310 to block 314, wherein the accumulated position error AXerr is normalized by dividing by the length of the seek (i.e., the number of tracks) to determine a normalized, accumulated position error "NAXerr". Next, an adjustment value "Kadj" is determined by block 316 using the following relationship:

$$Kadj = \frac{(NAXerr - NOMXerr)}{\text{scale factor}} \quad (5)$$

where NOMXerr is a nominal value for the position error associated with a desired gain for the servo circuit 150 and the scale factor is a value used to control the convergence of the adjustment of the gain Kp. Both of these terms will be discussed in greater detail below.

Once the adjustment value Kadj is determined, the routine of FIG. 6 proceeds to block 318, wherein the gain Kp is adjusted to a new value as follows:

$$Kp = PREVKp - Kadj \quad (6)$$

where Kp is the new value for the gain block 236, PREVKp is the previous (existing) value for the gain Kp and Kadj is determined by equation (5). Thus, the new value for Kp is determined by subtracting the adjustment value Kadj from the previous value of the gain PREVKp. Accordingly, in block 318 the new value for the gain Kp is provided by the accumulator 250 (FIG. 4) to the gain block 236 and it will be understood that the operation of block 318 includes the closing of the switch 254 so as to allow the transmission of the new gain Kp to the gain block 236.

Figure 7:
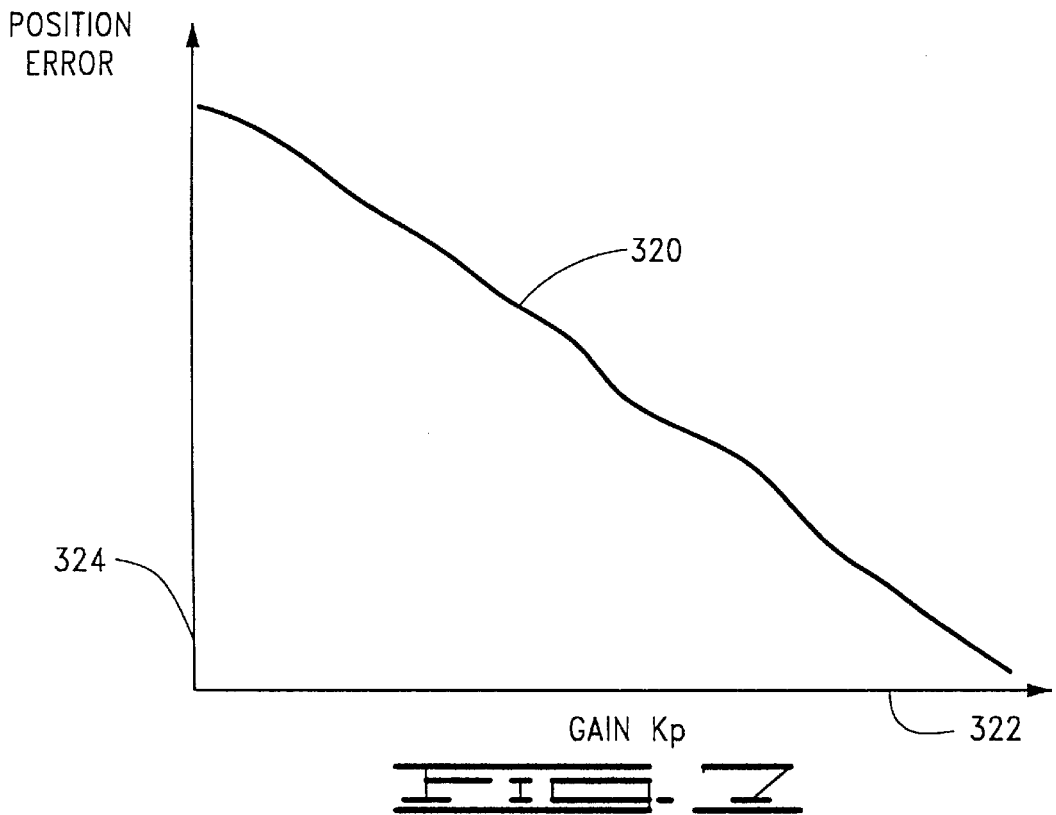
FIG. 7 provides a graphical representation of the nominal relationship between position error and gain of the servo circuit of FIG. 3.

Referring now to FIG. 7, shown therein is a graphical representation of the nominal relationship between position error and gain Kp for the disc drive 100. More particularly, FIG. 7 provides a curve 320 plotted against an x-axis 322 indicative of gain Kp and a y-axis 324 indicative of position error. From FIG. 7, it can be seen that a generally linear relationship exists between the gain Kp and the position error, with the error generally decreasing with increases in gain.

For reference, the curve 320 was obtained by sequentially varying the gain Kp and determining the nominal position error over a plurality of seeks. Hence, the relationship between gain and error will vary somewhat depending upon the characteristics each particular disc drive. Moreover, it has been found that the relationship between gain and error for each drive can vary depending upon the direction of a seek (whether toward the inner or outer diameter of the disc 108), although such differences generally diminish with increases in seek length.

In the practice of the preferred embodiment, a nominal value of gain Kp is initially selected for the disc drive 100 based upon a variety of factors, including for example, the desired robustness of the servo circuit 150 in view of off-track errors caused by vibration and shock inputs. Once the nominal gain Kp is selected, the nominal value for the accumulated position error can be determined from data such as shown in FIG. 6 and this value is used as the value NOMXerr of equation (5) and block 316 of FIG. 6.

Figure 8:
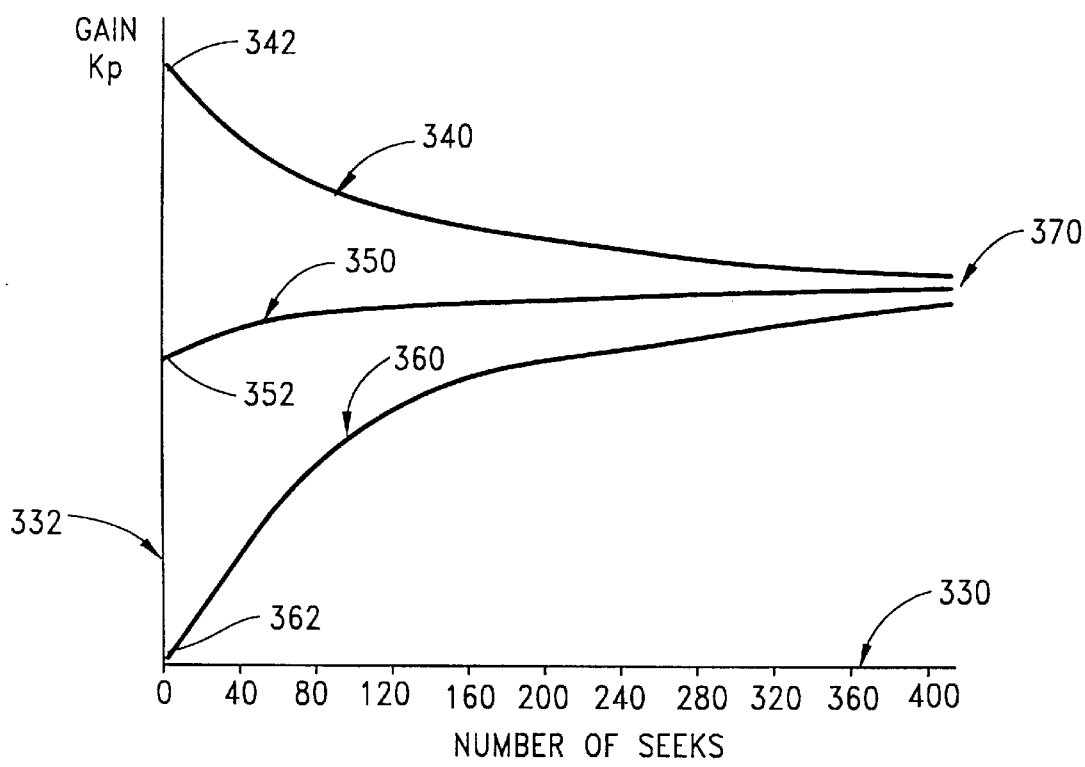
FIG. 8 provides a graphical representation of the convergence of the gain to an optimal value over a range of initial values for the gain, in accordance with the execution of the routine of FIG. 6 over a plurality of model reference seeks.

Referring now to FIG. 8, shown therein is a graphical representation of the convergence of various initial values of the gain Kp to an optimal value in accordance with the preferred embodiment disclosed herein. FIG. 8 includes an x-axis 330 indicative of a total number of model reference seeks performed by the disc drive 100 and a y-axis 332 indicative of the relative values of the gain Kp.

Against the axes 330, 332 are plotted three different convergence curves; a first curve 340 beginning at an initial, high value for Kp (at point 342), a second curve 350 beginning at an initial, intermediate value for Kp (at point 352) and a third curve 360 beginning at an initial, low value for Kp (at point 362). Although initial values for the gain Kp were selected over a relatively large range, over a number of successive seeks the values all converge to near an optimum value for the gain Kp, generally indicated at 370. The rate of convergence for each of these curves is determined through the selection of the scale factor of equation (5) and block 316 of FIG. 6. Although each of the measurements corresponding to the graph of FIG. 8 utilized the same scale factor, it will be recognized that the selection of a larger scale factor will generally decrease the rate of convergence, whereas selection of a smaller 5 scale factor will generally increase the rate of converge. However, selection of a larger scale factor will generally reduce instabilities that might arise during the convergence.

It is contemplated that the routine of FIG. 6 will be performed continually during the operation of the disc drive 100, so that adjustments are made to the gain Kp after the completion of each model reference seek. As most seeks in a disc drive are typically fairly short in length and disc drives spend a relatively significant amount of time seeking from track to track during read and write operations, it is contemplated that such adjustments to the gain Kp will occur on a sufficiently frequent basis during operation to maintain the gain at or near an optimal level.

However, it is further contemplated that the preferred embodiment can be advantageously utilized as an additional calibration routine during idle periods of time for the disc drive 100, so that further adjustments in the servo gain Kp can be performed when the disc drive is not being utilized to transfer data between the discs 108 and the host computer 140. Such use has the advantage of ensuring that changes in environmental conditions during such idle periods do not result in large errors in the response of the servo circuit 150 once the disc drive 100 once again initiates data transfer operations.

In summary, the preferred embodiment disclosed herein is directed to an apparatus and method for optimizing the gain (Kp) of a servo circuit (such as 150) of a disc drive (such as 100), in which a reference generator (such as 214) generates reference current, velocity and position signals (such as 270, 280 and 290) which are used to position a head (such as 118) during a model reference seek (such as by block 308). A multi-rate observer (such as 206) generates an estimated position of the head and an accumulator (such as 250) accumulates position error during the seek (such as by block 312), with the position error corresponding to the difference between the reference position and the estimated position.

At the conclusion of the seek (such as by block 310), the accumulated position error is normalized in relation to the length of the seek (such as by block 314) and a gain adjustment value is determined in relation to the difference between the normalized accumulated position error and a nominal accumulated position error (such as by block 316). The gain is thereafter adjusted through the application of the gain adjustment value (such as by block 318).

In the preferred embodiment, the reference current signal is characterized as a modified one minus cosine waveform which is scaled in relation to the length of each seek and is used to derive the reference velocity and position signals. Moreover, a scale factor is used to control the rate of convergence of the gain.

For purposes of the appended claims, the term "circuitry" will be understood to include both hardware and software (firmware) implementations. Further, the use of the term "signal" will be understood to include both analog and digital implementations and the term "sinusoidal" will be understood to include cosine type functions.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing gain in a disc drive servo circuit, comprising steps of:
   (a) initiating a seek of a selected length by providing reference current, velocity and position signals to move a head of the disc drive from an initial track to a destination track over a succession of time periods using a first value of gain;
   (b) determining a position error at each time period of the seek in relation to the difference between the reference position signal and an estimated position signal indicative of estimated position for the head;
   (c) determining an accumulated position error value in relation to the sum of the position errors for each time period of the seek;
   (d) generating a normalized accumulated position error value in relation to the accumulated position error divided by a value indicative of the length of the seek;
   (e) obtaining a gain adjustment value in relation to the difference between the normalized accumulated position error value and a nominal position error value associated with a nominal value of gain for the servo circuit; and
   (f) determining a second, updated value of gain in relation to a difference between the first gain and the gain adjustment value, the second updated value of gain stored for use during a subsequent performance of step (a).

2. The method of claim 1, wherein the seek is characterized as a model reference seek wherein the reference current signal is generated from a modified sinusoidal waveform having both positive and negative components.

3. The method of claim 2, wherein the reference current signal is further characterized as a modified one minus cosine waveform scaled in relation to the length of the seek and the reference velocity and position signals are derived from the reference current signal.

4. The method of claim 1, wherein step (e) is further characterized by dividing the difference between the normalized accumulated position error value and the nominal position error value by a predetermined scale factor, the scale factor controlling a rate of convergence of the gain of the servo circuit so that the gain is converged to an optimal value over a plurality of successive seeks.

5. The method of claim 1, wherein the reference current, velocity and position signals are generated by a reference generator, the estimated position signal is generated by a multi-rate observer and the time periods are determined as multi-rate periods of the observer occurring at a multiple of a frequency at which servo information is sampled from a disc of the disc drive.

6. The method of claim 1, wherein an accumulator is used to accumulate the accumulated position error value and the accumulator is initialized at the beginning of the seek.

7. The method of claim 1, wherein the method is performed as a calibration routine when the disc drive servo circuit is in an idle mode of operation.

8. In a disc drive of the type having a rotatable disc upon which a plurality of tracks are defined, a head and a servo circuit for controllably positioning the head with respect to the tracks, an apparatus for optimizing the performance of the servo circuit comprising:

reference generator circuitry generating a reference current, velocity and position for the head during a seek of selected length;

observer circuitry generating an estimated position of the head during the seek;

gain block circuitry having a first gain of selected magnitude, the first gain utilized during the seek; and accumulator circuitry accumulating position error during the seek, the position error corresponding to the difference between the reference position and the estimated position, the accumulator updating the first gain of the gain block circuitry by subtracting a gain adjustment factor from the first gain to obtain the second gain, the second gain stored by the gain block circuitry and used during a subsequent seek.

9. The apparatus of claim 8, wherein the seek is characterized as a model reference seek wherein the reference current signal is generated from a modified sinusoidal waveform.

10. The apparatus of claim 9, wherein the reference current signal is further characterized as a modified one minus cosine waveform scaled in relation to the length of the seek and the reference velocity and position signals are derived from the reference current signal.

11. The apparatus of claim 8, wherein the accumulator circuitry further normalizes the accumulated position error in relation to the length of the seek to provide a normalized accumulated position error.

12. The apparatus of claim 11, wherein the accumulator circuitry further determines the difference between the normalized accumulated position error and a nominal position error associated with a nominal value of gain for the servo circuit to generate a gain adjustment value, and wherein the accumulator circuitry updates the gain of the gain block through application of the gain adjustment value.

13. The apparatus of claim 12, wherein accumulator circuitry further scales the difference between the normalized accumulated position error and the nominal value of the gain.

14. A disc drive, comprising:

a rotatable disc on which a plurality of tracks are defined;

a head adjacent the disc;

a servo circuit controllably positioning the head, the servo circuit having a servo processor which optimizes gain of the servo circuit over a plurality of model reference seeks in which the head is moved from an initial track to a destination track in accordance with sinusoidally derived reference current, velocity and position signals, wherein the servo processor is programmed to:

accumulate position error during each model reference seek to determine an accumulated position error, the position error determined in relation to the difference between the reference position and an estimated position for the head at each of a plurality of multi-rate periods of the seek;

determine a normalized position error by normalizing the position error in relation to the length of the seek;

determine a gain adjustment value in relation to the difference between the normalized position error and a nominal position error value associated with a nominal value of gain for the servo circuit;

scale the gain adjustmnent value by a scale factor, the scale factor controlling convergence of the gain of the servo circuit over the plurality of model reference seeks; and use the gain adjustment value to adjust the gain of the servo circuit.

15. The disc drive of claim 14, wherein the reference current signal used in each of the plurality of model reference seeks is characterized as a modified one minus cosine waveform, having amplitudes and durations determined in relation to the length of each seek.

16. The disc drive of claim 14, wherein at least selected ones of the plurality of model reference seeks are performed as part of a calibration routine at times when the disc drive is in an idle mode of operation.

* * * * *

UNITED STATES PATENT AND TRADEMARK OFFICE
CERTIFICATE OF CORRECTION

PATENT NO. : 6,031,684
DATED : February 29, 2000
INVENTOR(S) : Jason D. Gregg

It is certified that error appears in the above-identified patent and that said Letters Patent is hereby corrected as shown below:

Column 9,
Line 38, replace "a smaller 5 scale" with -- a smaller scale --.

Signed and Sealed this

Second Day of October, 2001

Attest:

*Nicholas P. Godici*

NICHOLAS P. GODICI
*Attesting Officer*   *Acting Director of the United States Patent and Trademark Office*